(12) United States Patent
Danley et al.

(10) Patent No.: US 12,044,181 B1
(45) Date of Patent: Jul. 23, 2024

(54) FUSIBLE GEARBOX CENTER GUIDE SUPPORT WITH CATCHER PIN AND ANTI-ROTATION PIN SYSTEMS AND METHODS

(71) Applicant: Raytheon Technologies Corporation, Farmington, CT (US)

(72) Inventors: Steven Michael Danley, Ellington, CT (US); Ahmad Sajad Delawar, Manchester, CT (US); Ryan K. Snyder, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/297,589

(22) Filed: Apr. 7, 2023

(51) Int. Cl.
*F02C 7/32* (2006.01)
*F16M 13/02* (2006.01)

(52) U.S. Cl.
CPC .............. *F02C 7/32* (2013.01); *F16M 13/02* (2013.01); *F05D 2260/30* (2013.01)

(58) Field of Classification Search
CPC ........................................................ F02C 7/32
See application file for complete search history.

(56) References Cited

U.S. PATENT DOCUMENTS

| | | | |
|---|---|---|---|
| 5,078,342 A | 1/1992 | Langley et al. | |
| 5,303,880 A | 4/1994 | Cencula et al. | |
| 6,170,252 B1 | 1/2001 | Van Duyn | |
| 7,494,317 B2 * | 2/2009 | Keller | F01D 11/08 415/173.1 |
| 9,500,133 B2 | 11/2016 | Davis et al. | |
| 9,777,639 B2 | 10/2017 | Davis et al. | |
| 9,958,217 B1 * | 5/2018 | Oakes | F28F 9/0138 |
| 10,774,008 B2 * | 9/2020 | Subramanian | F01D 9/041 |
| 11,215,080 B1 * | 1/2022 | Freeman | F01D 25/12 |
| 11,319,828 B1 * | 5/2022 | Freeman | F01D 11/08 |
| 11,441,441 B1 * | 9/2022 | Freeman | F01D 11/08 |
| 11,479,104 B2 | 10/2022 | Appelby et al. | |
| 11,499,444 B1 * | 11/2022 | Freeman | F01D 25/246 |

(Continued)

OTHER PUBLICATIONS

USPTO; Non-Final Office Action dated Mar. 4, 2024 in U.S. Appl. No. 18/132,347.

(Continued)

*Primary Examiner* — Long T Tran
(74) *Attorney, Agent, or Firm* — SNELL & WILMER L.L.P.

(57) ABSTRACT

An assembly for mounting an auxiliary component to an engine case for a gas turbine engine includes a support bracket and a locator. The locator includes a fusible guide pin extending at least partially into a first aperture disposed in the support bracket, and a catcher pin extending at least partially into a second aperture disposed in the support bracket. The fusible guide pin is configured to fracture to absorb energy while the catcher pin limits system displacement during and post an overload event, thus reducing the energy transmitted to the auxiliary component (e.g., a gearbox housing). The locator can further include an anti-rotation pin extending from the plate member and configured to be received by the auxiliary component. The anti-rotation pin prevents rotation of the locator, about a third pin of the locator, with respect to the auxiliary component when the fusible guide pin is broken.

20 Claims, 6 Drawing Sheets

(56) References Cited

U.S. PATENT DOCUMENTS

| | | |
|---|---|---|
| 11,655,766 B2 | 5/2023 | Martin et al. |
| 11,821,329 B2 | 11/2023 | Van Maren et al. |
| 2011/0296847 A1 | 12/2011 | Williams |
| 2011/0305567 A1* | 12/2011 | Milfs .................... F16C 27/045 |
| | | 29/898 |
| 2012/0304811 A1 | 12/2012 | Niggemeier et al. |
| 2013/0042630 A1 | 2/2013 | Muldoon |
| 2014/0084130 A1 | 3/2014 | Rejman et al. |
| 2014/0314546 A1 | 10/2014 | Davis et al. |
| 2016/0017811 A1 | 1/2016 | Martin et al. |
| 2016/0230601 A1 | 8/2016 | Bettagere et al. |
| 2016/0238324 A1 | 8/2016 | Butcher et al. |
| 2016/0245710 A1 | 8/2016 | Twelves, Jr. et al. |
| 2020/0124084 A1 | 4/2020 | Mabire |
| 2021/0172341 A1 | 6/2021 | Fryer |
| 2021/0189897 A1* | 6/2021 | Sippel ..................... F01D 11/08 |
| 2021/0355835 A1* | 11/2021 | Freeman ................ F01D 11/08 |
| 2022/0290615 A1 | 9/2022 | Weaver et al. |
| 2023/0057017 A1 | 2/2023 | Van Maren et al. |
| 2023/0105543 A1 | 4/2023 | Martin et al. |

OTHER PUBLICATIONS

USPTO; Notice of Allowance dated Mar. 13, 2024 in U.S. Appl. No. 18/297,583.

USPTO; Non-Final Office Action dated Mar. 4, 2024 in U.S. Appl. No. 18/297,577.

\* cited by examiner

FUSIBLE GEARBOX CENTER GUIDE SUPPORT WITH CATCHER PIN AND ANTI-ROTATION PIN SYSTEMS AND METHODS

FIELD

The present disclosure relates generally to gas turbine engines and, more particularly, to auxiliary component mounting systems for gas turbine engines.

BACKGROUND

Gas turbine engines typically utilize a turbine fan to draw ambient air into the engine for compression and combustion by the engine. The turbine fan is shrouded by an engine casing. Various auxiliary components, such as electrical boxes, engine oil tanks, gearboxes, valves, control systems for regulating engine operations, and other components, are mounted to the engine casing. Various mounting systems mount the auxiliary components to the engine casing.

Conventional mounting systems may become subjected to a high degree of shock loading not experienced during normal engine operating conditions. For example, a high shock load may result from a fan blade out (FBO) event, which occurs when a fan blade breaks off an engine rotor body. An FBO event may also result in an imbalance in the engine rotor body which may cause outward deflection and a rotor body shaft imbalance. The mounting system may not be able to withstand the high shock load of a FBO event, causing separation of the auxiliary components from the engine casing, or the mounting system may transfer the high shock load to the auxiliary components, causing damage to the auxiliary components.

Auxiliary components of particular concern include the gearboxes used to drive other components of the gas turbine engine. As part of an aircraft engine design, gearboxes are subjected to competing criteria. For example, on one hand, it may be desirable to use light-weight materials as part of the gearbox hardware in order to reduce aircraft weight. On the other hand, the gearbox materials should be sufficiently strong and durable in order to withstand various loads. FBO event loads are often the limiting factor as part of a conventional gearbox design. A FBO event may result in large rotor imbalance loads based on a fan blade becoming detached from a fan hub or rotor.

SUMMARY

An assembly for mounting an auxiliary component to an engine case of a gas turbine engine is disclosed. In various embodiments, the assembly includes a support bracket, the support bracket having a first end configured for attachment to a first flange of the engine case, a second end configured for attachment to a second flange of the engine case, and an intermediate portion located intermediate the first end and the second end, a first aperture disposed in the intermediate portion, a second aperture disposed in the intermediate portion, and a locator. The locator comprises a plate member, a fusible guide pin extending from the plate member at least partially into the first aperture, a catcher pin extending from the plate member at least partially into the second aperture, and a third pin extending from the plate member and configured to be received by the auxiliary component.

In various embodiments, the third pin extends from the plate member in a direction opposite the fusible guide pin and the catcher pin.

In various embodiments, the locator further comprises an anti-rotation pin extending from the plate member and configured to be received by the auxiliary component. The anti-rotation pin can extend from the plate member in the direction opposite the fusible guide pin and the catcher pin. In various embodiments, the anti-rotation pin is configured to react a torque load about a central axis of the third pin, the torque load generated in response to contact between the catcher pin and the support bracket when the fusible guide pin is broken, to prevent rotation of the locator with respect to the auxiliary component. In various embodiments, the anti-rotation pin is located opposite the third pin from the catcher pin.

In various embodiments, the fusible guide pin comprises a mechanical fuse configured to break in response to an overload event.

In various embodiments, the catcher pin is configured to limit movement of the locator with respect to the support bracket when the mechanical fuse is broken.

In various embodiments, the assembly further comprises a bearing member disposed at least partially within the first aperture, wherein the fusible guide pin is disposed at least partially within the bearing member. In various embodiments, the bearing member is press fit at least partially into the support bracket, and the fusible guide pin is disposed at least partially within the bearing member.

In various embodiments, a first central axis of the fusible guide pin and a second central axis of the catcher pin are oriented radially with respect to the engine case.

In various embodiments, a first diameter of the second aperture is greater than a second diameter of the catcher pin.

A gas turbine engine is disclosed. In various embodiments, the gas turbine engine includes an engine case, the engine case including a first flange and a second flange, an auxiliary component, a support bracket, the support bracket having a first end configured for attachment to the first flange of the engine case, a second end configured for attachment to the second flange of the engine case, and an intermediate portion located intermediate the first end and the second end, a first aperture disposed in the intermediate portion, a second aperture disposed in the intermediate portion, and a locator. The locator comprises a plate member, a fusible guide pin extending from the plate member at least partially into the first aperture, and a catcher pin extending from the plate member at least partially into the second aperture, and a third pin extending from the plate member and configured to be received by the auxiliary component.

In various embodiments, the locator further comprises an anti-rotation pin extending from the plate member and configured to be received by the auxiliary component. In various embodiments, the third pin and the anti-rotation pin extend from the plate member in a direction opposite the fusible guide pin and the catcher pin. In various embodiments, the anti-rotation pin is located opposite the third pin from the catcher pin.

In various embodiments, the fusible guide pin comprises a mechanical fuse configured to break in response to an overload event, and the catcher pin is configured to limit movement of the locator with respect to the support bracket when the mechanical fuse is broken.

In various embodiments, the gas turbine engine further comprises a bearing member disposed at least partially within the first aperture, wherein the fusible guide pin is disposed at least partially within the bearing member.

In various embodiments, the bearing member is press fit at least partially into the support bracket, and the fusible guide pin is disposed at least partially in the bearing member.

In various embodiments, a first diameter of the second aperture is greater than a second diameter of the catcher pin.

In various embodiments, the second aperture is oversized to allow radial movement, with respect to a central axis of the second aperture, of the catcher pin within the second aperture.

A locator for mounting an auxiliary component to an engine case of a gas turbine engine is disclosed. In various embodiments, the locator includes a plate member, a fusible guide pin extending from the plate member in a first direction, a catcher pin extending from the plate member in the first direction, a third pin extending from the plate member in a second direction, opposite the first direction, wherein the third pin is disposed substantially coaxially with the fusible guide pin.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
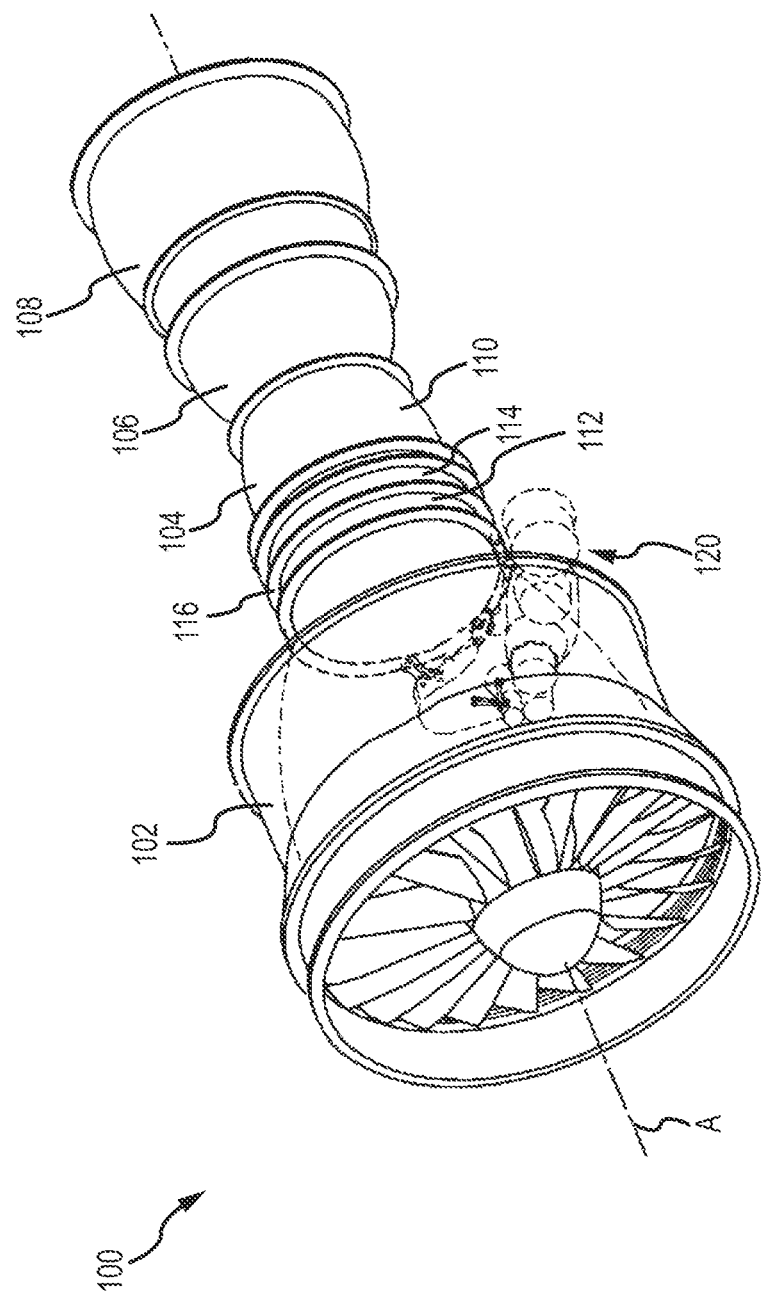
FIG. 1A provides a schematic perspective view of a gas turbine engine having a gearbox mounted to an external case of the gas turbine engine, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

For purposes of clarity, it should be understood that the term "rigidly coupled" is to mean a connection that prevents relative movement between the outer diameter of the frangible ring member and the support bracket, and includes press fit connections, threaded connections, monolithic connections (e.g., additively manufactured as a single piece), and metal joining connections such as a weld, a braze, or a solder. The term "rigidly coupled" also includes a connection that can be broken upon the application of sufficient force, without braking the support bracket. Moreover, the term "rigidly coupled" further includes a connection between the outer diameter surface of the frangible ring member and the support bracket that can allow the radially inner portion of the frangible ring member to move with respect to the support bracket and/or plastically deform.

The present disclosure provides, as part of a gearbox mounting system, a fusible center guide pin and a catcher pin. A fusible center guide pin of the present disclosure can mitigate/absorb energy transmitted to an auxiliary component, such as a gearbox housing, thereby reducing or eliminating the tendency for the auxiliary component (e.g., gearbox housing) to crack or fracture. In response to the fusible center guide pin breaking, the catcher pin can engage a support bracket to limit movement of the auxiliary component with respect to an engine case, thereby eliminating or reducing contact of the gearbox with adjacent components which could cause further damage. Movement of the gearbox with respect to the engine case can cause loads to be reacted between the locator and the support bracket via the catcher pin. These loads can generate a moment (e.g., torque) about an auxiliary component pin (also referred to herein as a second member, a third pin, or a gearbox pin) which can cause unwanted movement of the locator with respect to the gearbox. An anti-rotation pin (also referred to herein as a fourth member) can be provided with the locator and configured to extend into a second receptacle located in the gearbox housing to react these moments and prevent the locator from rotating about a central axis of the auxiliary component pin. In various embodiments, a locator of the present disclosure is manufactured as a single-piece (e.g., monolithic) component. A gearbox mounting system of the present disclosure provides a low cost, low weight solution within the available design space.

Figure 1B:
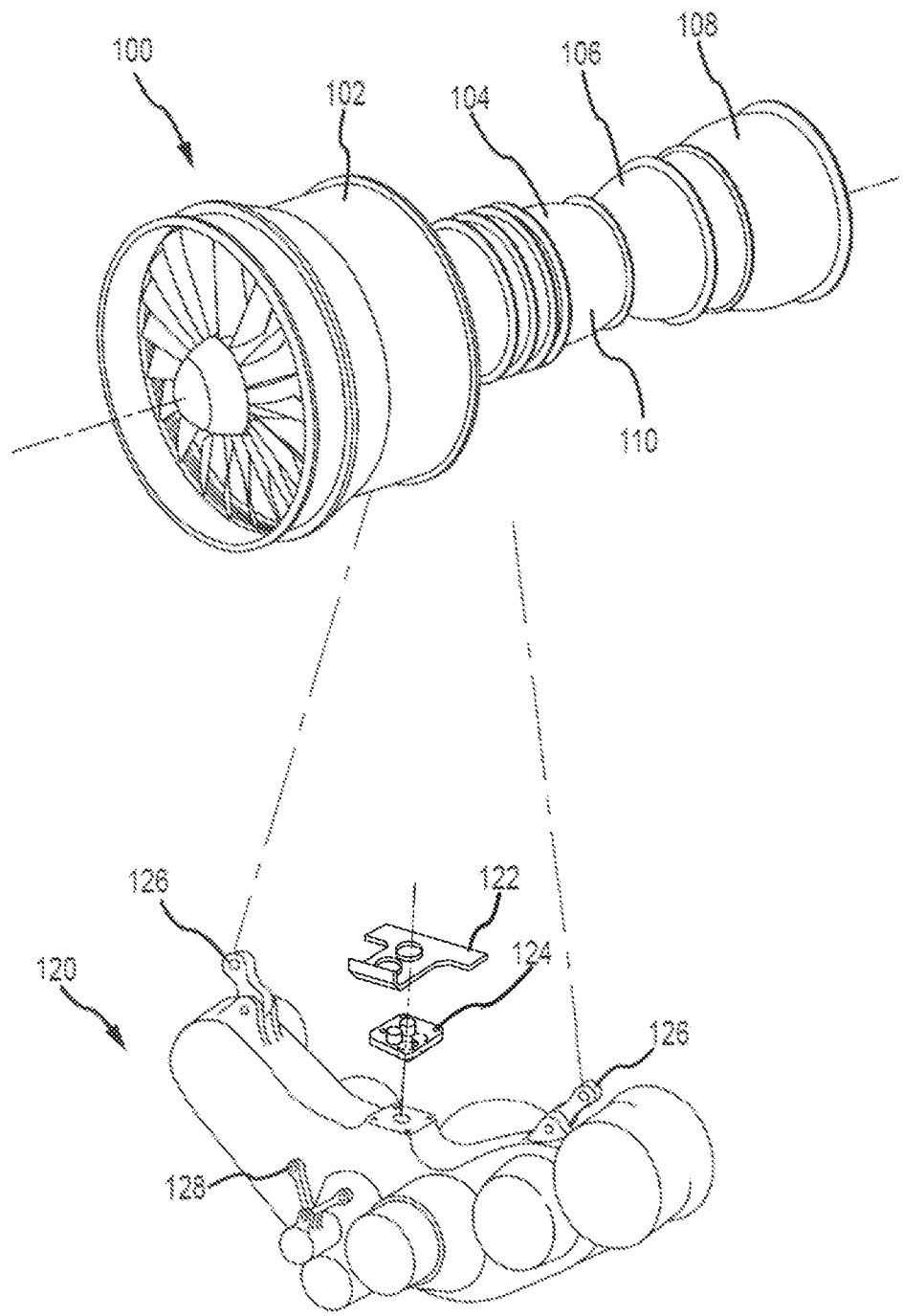
FIG. 1B provides a schematic exploded view of the gas turbine engine shown in FIG. 1A, and a gearbox mounting system for mounting the gearbox to the external case of the gas turbine engine, in accordance with various embodiments.

Referring now to the drawings, FIG. 1A and FIG. 1B schematically illustrate a gas turbine engine 100, in accordance with various embodiments. The gas turbine engine 100 includes a fan section 102, a compressor section 104, a combustor section 106 and a turbine section 108. Typically, the compressor section 104 and the turbine section 108 each contain one or more stages that rotate about a central rotational axis A. An engine case 110 serves as a main structural support for the gas turbine engine 100 and surrounds each of the compressor section 104, the combustor section 106 and the turbine section 108. In various embodiments, the engine case 110 is constructed of individual case sections, such as a first case section 112 and a second case section 114, that are joined together at bolted flanges, such as, flange 116. A gearbox 120 is illustrated as being mounted to a forward end of the engine case 110 proximate the compressor section 104. Referring more particularly to FIG. 1B, the gearbox 120 is mounted to the engine case 110 via a support bracket 122 and a guide pin 124 configured to maintain the gearbox 120 in proper alignment and position with respect to the engine case 110. In various embodiments, one or more side links 126 and a forward link 128 may also be used to mount the gearbox 120 to the engine case 110.

Figure 2A:
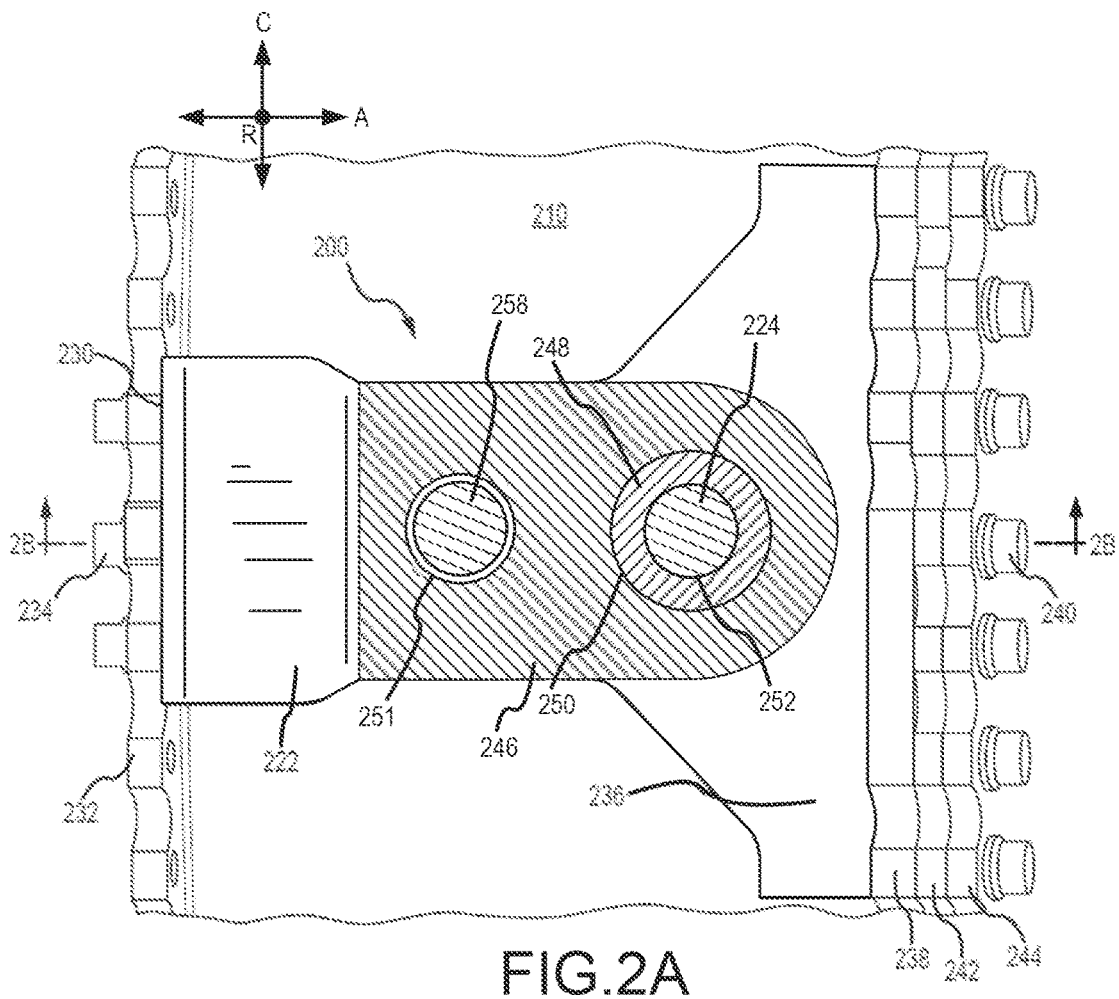
FIG. 2A provides a schematic radial view of a gearbox mounting assembly, including a support bracket and a locator comprising a fusible guide pin and a catcher pin, mounted to a portion of an engine case, in accordance with various embodiments.
Figure 2B:
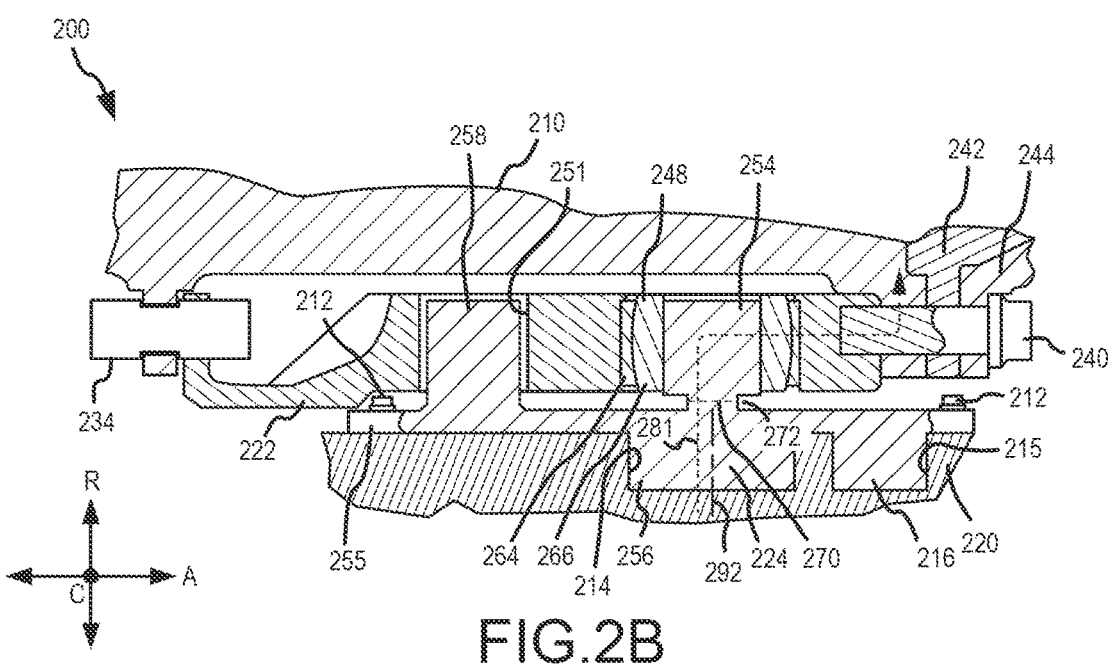
FIG. 2B provides a schematic side view of the gearbox mounting assembly shown in FIG. 2A, in accordance with various embodiments.

Referring now to FIG. 2A and FIG. 2B, schematic radial and section views, respectively, of a gearbox mounting assembly 200 mounted to a portion of an engine case 210 are illustrated, in accordance with various embodiments. Any reference to the terms axis and axial may include axis A described above or a dimension parallel to such axis; though in various embodiments, the term axial refers to a centerline axis of first member 254, second member 256, and/or third member 258, as described herein. Axis A is oriented in the A direction (i.e., axial direction) on the provided ARC axes. The R direction on the provided ARC axes refers to a radial direction and the C direction on the provided ARC axes refers to a circumferential direction. The gearbox mounting assembly 200 includes a support bracket 222 and a locator 224. In various embodiments, support bracket 222 is disposed radially between locator 224 and engine case 210. Stated differently, locator 224 may be disposed radially outward from support bracket 222. In various embodiments, the support bracket 222 includes a first end 230 configured for connection to a first flange 232 of the engine case 210 via a first plurality of bolts 234 and a second end 236 configured for connection to a second flange 238 of the engine case 210 via a second plurality of bolts 240. In various embodiments, the second end 236 of the support bracket 222 may also be connected to additional flanges. For example, where the engine case 210 is a high-pressure compressor case, the second flange 238 may be positioned adjacent to an inner diffuser case flange 242 and an outer diffuser case flange 244. The support bracket 222 also includes an intermediate portion 246 located intermediate the first end 230 and the second end 236 and configured to support a bearing member 248 (e.g., a spherical bearing). Intermediate portion 246 may define a first cylindrical aperture 250 that extends into or through the intermediate portion 246 of the support bracket 222. Intermediate portion 246 may further define a second cylindrical aperture 251 that extends into or through the intermediate portion 246 of the support bracket 222. In various embodiments, second cylindrical aperture 251 can be disposed axially (with respect to the central rotational axis A described above) with respect to the first cylindrical aperture 250. In various embodiments, second cylindrical aperture 251 can be axially (with respect to the central rotational axis A described above) aligned with respect to the first cylindrical aperture 250 (i.e., aligned along cut-line 2B in FIG. 2A).

In various embodiments, the locator 224 includes a plate member 255 (see FIG. 2B) that may be mounted to the casing or housing 220 of the auxiliary component (e.g., a casing of the gearbox 120). In various embodiments, the plate member 255 is bolted to the housing 220 with bolts 212.

In various embodiments, the locator 224 further includes a first member 254 (e.g., a first cylindrical member; also referred to herein as a fusible guide pin) extending from the plate member 255. First member 254 may comprise a (center) guide pin for locating (e.g., centering) the auxiliary component with respect to engine case 210. First member 254 can be integrally formed with plate member 255. A first end of first member 254 can be integrally attached to plate member 255 and a second end of first member 254 may be free (i.e., first member 254 may extend from plate member 255 in a cantilevered fashion).

In various embodiments, bearing member 248 may be press fit into first cylindrical aperture 250. In various embodiments, first member 254 of the locator 224 may be positioned in the bearing member 248. In various embodiments, a third cylindrical aperture 252 is defined by an inner diameter surface of bearing member 248. First member 254 may be positioned and secured in the third cylindrical aperture 252. In various embodiments, a free end of first member 254 is disposed at least partially into bearing member 248. In various embodiments, bearing member 248 comprises an outer race 264 and a moveable member 266 supported by, and moveable with respect to, the outer race 264. First member 254 may be disposed in moveable member 266. In various embodiments, first member 254 and bearing member 248 are coaxially located within first cylindrical aperture 250. Bearing member 248 may allow nominal movement of gearbox housing 220 with respect to engine case 210 (i.e., as moveable member 266 pivots within outer race 264).

In various embodiments, the locator 224 further includes a second member 256 (e.g., a second cylindrical member; also referred to herein as a third pin or an auxiliary component pin) configured for insertion into an aperture or receptacle 214 extending into a casing or housing 220 of an auxiliary component (e.g., the gearbox 120 illustrated in FIG. 1A and FIG. 1B). Second member 256 can be integrally formed with plate member 255. Second member 256 may be disposed opposite plate member 255 from first member 254. In various embodiments, second member 256 is coaxial with first member 254. In various embodiments, second member 256 is substantially coaxial with first member 254 such that loads resulting from side-to-side (i.e., along the circumferential direction of the engine case 210, with respect to the central rotational axis A described above) motion of the auxiliary component is transferred between first member 254 and second member 256 without imparting a moment or torque on plate member 255 about the centerline axis 292 of second member 256. In various embodiments, second member 256 and first member 254 are disposed parallel one another (i.e., a centerline axis 292 of the second member 256 is parallel with a centerline axis of the first member 254).

In various embodiments, the locator 224 further includes a third member 258 (e.g., a third cylindrical member; also referred to herein as a catcher pin) extending from the plate member 255. Third member 258 may comprise a catcher pin for limiting motion of the auxiliary component with respect to engine case 210 in the event first member 254 fractures such that the first member 254 is no longer supporting the auxiliary component with respect to the engine case 210. Third member 258 can be integrally formed with plate member 255. In various embodiments, third member 258 and first member 254 are disposed parallel one another (i.e., a centerline axis of the third member 258 is parallel with a centerline axis of the first member 254). In various embodiments, the centerline axis of third member 258 is oriented radially with respect to a central axis of the engine case 210 (i.e., with respect to the central rotational axis A described above).

Referring more particularly to FIG. 2B, a mechanical fuse 270 may be incorporated into first member 254. The mechanical fuse 270 is configured to break or fracture a portion of the first member 254 in the event of a FBO, for example, such that the auxiliary component (e.g., the gearbox 120) remains attached to the engine case 210. The mechanical fuse 270 extends through a portion of first member 254 and is formed by an annular cut 272 that extends circumferentially about the radially outer portion of the at least one of first member 254. Because of the annular cut 272, the mechanical fuse 270 that results provides a localized region that is designed to fracture during an overload event, such as a FBO, where the overload is typically applied in an axial direction (with respect to the central rotational axis A described above). As illustrated, in various embodiments, the mechanical fuse 270 defines a diameter that is typically less than a nominal diameter of first member 254.

With reference to FIG. 2A and FIG. 2B, to accommodate movement of the locator 224 following an overload event, third member 258 is configured to catch (or to hold substantially in place) the locator 224 following fracture of first member 254. Third member 258 may be positioned adjacent to a radial inner surface of support bracket 222 defining second cylindrical aperture 251 such that a radial outer surface of third member 258 is configured to contact said radial inner surface of support bracket 222. In various embodiments, second cylindrical aperture 251 is oversized (i.e., comprises a diameter greater than the diameter of third member 258) such that the third member 258 and support bracket 222 define an annular volume or void that separates the third member 258 from support bracket 222. In this manner, limited movement (perpendicular to axis 292) between the third member 258 and the support bracket 222 (thereby allowing limited movement of the auxiliary component with respect to engine case 210) may be permitted following an overload event and the fracturing of first member 254. The spacing between third member 258 and second cylindrical aperture 251 can be set to allow axial and circumferential motion of the gearbox 120 to be limited to prevent excessive motion which can allow substantial contact between gearbox mounted hardware and surrounding engine mounted hardware in the event of an FBO.

In various embodiments, the diameter of first member 254 (i.e., at mechanical fuse 270) is determined based on an ultimate shear strength calculated to be less than a predicted load expected during the overload event. In various embodiments, for example, the ultimate shear strength of first member 254 is equal to a value within a range of 10% to 95% of the predicted overload; or, in various embodiments, the ultimate shear strength is equal to a value within a range of 25% to 90% of the predicted overload; or, in various embodiments, the ultimate shear strength is equal to a value within a range of 50% to 90% of the predicted overload; or, in various embodiments, the ultimate shear strength is equal to a value within a range of 70% to 80% of the predicted overload. In various embodiments, the shear strength of first member 254 may be selected so that the ultimate shear strength of first member 254 is less than the predicted overload—and low enough that the supported hardware survives the overload event, but high enough to withstand loads expected during normal operation and/or other loads which are less than those expected during a FBO event. The ultimate shear strength of the first member 254 is less than that of the second member 256. The ultimate shear strength of the first member 254 is less than that of the third member 258. It should be understood that the ultimate shear strengths of first member 254, the second member 256, and the third member 258 can be measured under similar conditions (e.g., room temperature or operating temperature) and measured in force divided by area. In SI, the unit is the pascal (Pa) or newtons per square meter. In United States customary units, shear stress is also commonly measured in pounds-force per square inch or kilopounds-force per square inch.

Figure 2C:
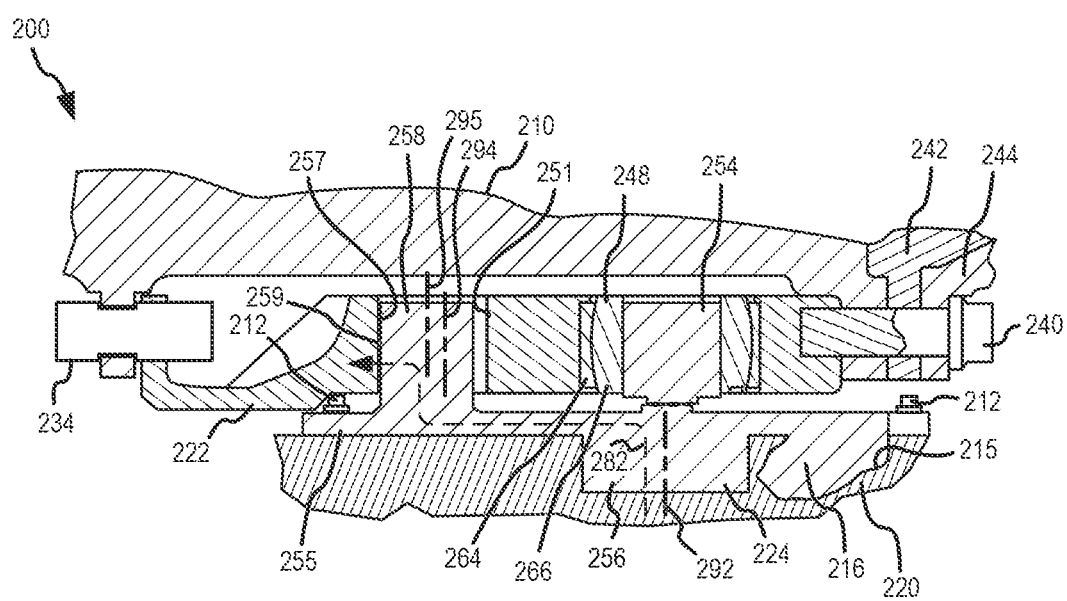
FIG. 2C provides a schematic side view of the gearbox mounting assembly shown in FIG. 2B, with a broken fusible guide pin, in accordance with various embodiments.

With reference to FIG. 2C, gearbox mounting assembly 200 is illustrated after a FBO event and with the third member 258 moved (i.e., axially with respect to the central rotational axis A described above, or radially with respect to central axis 294 of second cylindrical aperture 251) within second cylindrical aperture 251 and the mechanical fuse 270 of first member 254 broken. In this regard, the central axis 295 of third member 258 can be moved radially with respect to central axis 294. After the FBO event, movement (e.g., axial and/or circumferential, with respect to the central rotational axis A described above) of locator 224 (and third member 258) may be permitted, while still maintaining third member 258 captured within second cylindrical aperture 251 to limit movement of the gearbox housing 220 with respect to engine case 210 (see FIG. 2B). In this regard, the outer diameter surface 259 of the third member 258 is configured to contact the inner diameter surface 257 of second cylindrical aperture 251 in response to an overload event and first member 254 breaking.

With reference to FIG. 2B, prior to mechanical fuse 270 breaking (e.g., prior to an overload event) a first load path 281 is formed from gearbox housing 220, through second member 256, plate member 255, first member 254, bearing member 248, support bracket 222, and into engine case 210 via first plurality of bolts 234 and second plurality of bolts 240. In this regard, prior to mechanical fuse 270 breaking, loads can be reacted between gearbox housing 220 and engine case 210 via second member 256 and first member 254. Conversely, and with reference to FIG. 2C, after mechanical fuse 270 breaks (e.g., during and/or after an overload event) a second load path 282 is formed from gearbox housing 220, through second member 256, plate member 255, third member 258, support bracket 222, and into engine case 210 via first plurality of bolts 234 and second plurality of bolts 240. In this regard, after mechanical fuse 270 breaks, loads can be reacted between gearbox housing 220 and engine case 210 via second member 256 and third member 258.

In response to second load path 282 being formed, axial and/or circumferential movement of housing 220 can cause a moment or torque to be applied to locator 224 about axis 292 (due to third member 258 being offset from second member 256 which creates a moment arm about second member 256). In this regard, locator 224 can further comprise an anti-rotation pin 216 extending from plate member 255 into a second aperture or receptacle 215 located in housing 220; though in various embodiments, anti-rotation pin 216 can be omitted. In various embodiments, anti-rotation pin 216 is formed integrally with plate member 255. In various embodiments, an ultimate shear strength of anti-rotation pin 216 is greater than a combined ultimate shear strength of bolts 212. In various embodiments, anti-rotation pin 216 extends from plate member 255 opposite from first member 254. In various embodiments, a central axis of anti-rotation pin 216 is parallel with axis 292. In various embodiments, anti-rotation pin 216 comprises a cylindrical boss extending from plate member 255. Anti-rotation pin 216 may extend radially outward from plate member 255 when locator 224 is in an installed position. Anti-rotation pin 216 can be disposed opposite the second member 256 from third member 258.

In various embodiments, anti-rotation pin 216 reacts a torque load about axis 292 (generated by contact/loads between third member 258 and support bracket 222) to prevent rotation of locator 224 with respect to housing 220 in response to bolts 212 shearing, thereby preventing excessive motion which can allow substantial contact between gearbox mounted hardware and surrounding engine mounted hardware in the event of an FBO. In various embodiments, anti-rotation pin 216 reacts a torque load about 292 to prevent rotation of locator 224 with respect to housing 220 and to prevent bolts 212 from shearing, thereby preventing excessive motion which can allow substantial contact between gearbox mounted hardware and surrounding engine mounted hardware in the event of an FBO event. In various embodiments, bolts 212 are omitted and anti-rotation pin 216 reacts a torque load about 292 to prevent rotation of locator 224 with respect to housing 220 to prevent excessive motion which can allow substantial contact between gearbox mounted hardware and surrounding engine mounted hardware in the event of an FBO.

Figure 3A:
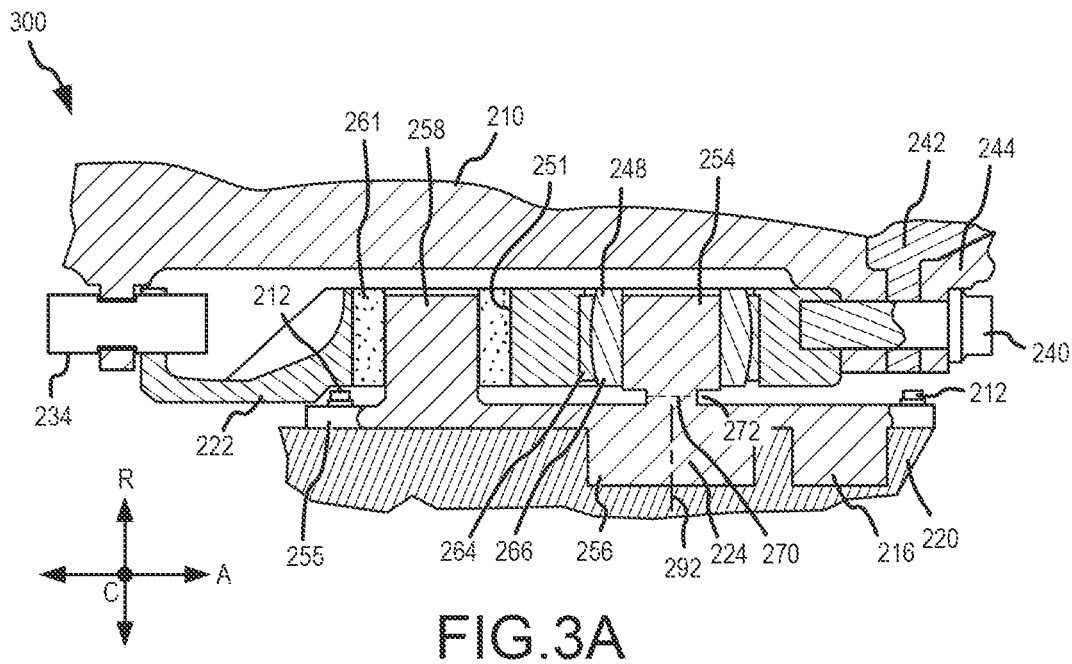
FIG. 3A provides a schematic circumferential view of a gearbox mounting assembly, including a support bracket and a locator comprising a guide pin supported by a bearing member and a catcher pin supported by a frangible ring member, mounted to a portion of an engine case, in accordance with various embodiments.

With reference to FIG. 3A, a gearbox mounting assembly 300 is illustrated, in accordance with various embodiments. Gearbox mounting assembly 300 is similar to gearbox mounting assembly 200, except that gearbox mounting assembly 300 further includes a frangible ring member 261 disposed around third member 258 for dissipating energy during an overload event. With respect to FIG. 3A and FIG. 3B, elements with like element numbering, as depicted in FIG. 2B, are intended to be the same and will not necessarily be repeated for the sake of clarity. In various embodiments, a frangible ring member 261 may be disposed in second cylindrical aperture 251. In various embodiments, frangible ring member 261 is rigidly coupled to the support bracket 222 (e.g., via a press fit, a threaded connection, a monolithic connection (e.g., additively manufactured as a single piece), or a metal joining process such as a weld, a braze, or a solder). In various embodiments, frangible ring member 261 is rigidly coupled directly to the support bracket 222. In various embodiments, frangible ring member 261 is press fit into second cylindrical aperture 251. Frangible ring member 261 may be positioned between a radial inner surface of support bracket 222 defining second cylindrical aperture 251 and a radial outer surface of third member 258. Frangible ring member 261 may define an annular volume that separates the third member 258 from support bracket 222. The frangible ring member 261 may permit movement (perpendicular to axis 292) between the third member 258 and the support bracket 222 (thereby allowing limited movement of the auxiliary component with respect to engine case 210) following an overload event and the fracturing of first member 254. The frangible volume may be configured to deform under FBO event loads, thereby absorbing some of the energy thereof. The thickness 262 of the frangible ring member 261 can be sized and configured to allow side-to-side (e.g., circumferential and/or axial, with respect to the central rotational axis A described above) motion of the gearbox 120 to be limited to prevent excessive motion which can allow substantial contact between gearbox mounted hardware and surrounding engine mounted hardware in the event of an FBO. The composition of the frangible ring member 261 can be set to provide stiffness sufficient for normal engine operation as well as "limit" conditions (e.g., bird strike or high powered surges) with the frangible ring member 261 material only yielding (deforming) under ultimate conditions such as FBO. Stated differently, the wall thickness (measured in the radial direction with respect to a centerline axis of the frangible ring member 261) can be selected to absorb FBO event energy while limiting system displacement during and post FBO event, thus reducing the energy transmitted to the gearbox housing. Frothed aluminum (also referred to as aluminum foam) and thin-walled, honeycomb aluminum or alloys thereof or steel are several varieties of frangible materials, however, other methods can be achieved with other materials using additive manufacturing techniques.

In various embodiments, the frangible, porous metal material of frangible ring member 261 can provide energy absorption during and following an FBO event. The frangible, porous metal material of frangible ring member 261 can be structured to ensure the mechanical fuse 270 of first member 254 breaks during the FBO event and can become more active as deflections increase via increased stiffness/density versus material diameter. Stated differently, the compressive strength of the frangible ring member 261 can increase with the diameter of the frangible ring member 261.

In various embodiments, the frangible ring member 261 is configured to deform in the event of a FBO, for example, such that the auxiliary component (e.g., the gearbox 120) remains attached to the engine case 210. For example, third member 258 can remain captured within frangible ring member 261 and/or second cylindrical aperture 251 to limit movement of the auxiliary component (e.g., the gearbox 120) with respect to the engine case 210.

In various embodiments, the density of the frangible ring member 261 material is determined based on an ultimate compressive strength calculated to be less than a predicted load expected during the overload event. In various embodiments, the density of the frangible ring member 261 material is equal to a value within a range of 10% to 80%; or, in various embodiments, the density is equal to a value within a range of 10% to 60%; or, in various embodiments, the density is equal to a value within a range of 10% to 50%, where the density is equal to the volume of the metal material divided by the total volume of the frangible ring member 261. For example, a frangible ring member 261 having 25% density would fill 25% of the periphery (or profile) of the frangible ring member 261, where 75% is occupied by a void (e.g., air). As an example, the density of the frangible ring member 261 material may be selected so that the ultimate compressive strength of frangible ring member 261 is less than the predicted overload—and low enough that the supported hardware survives the overload event, but high enough to withstand loads expected during normal operation and/or other loads which are less than those expected during a FBO event. The ultimate compressive strength of the frangible ring member 261 material is less than that of the support bracket 222. It should be understood that the ultimate compressive strengths of the frangible ring member 261 and the support bracket 222 can be measured under similar conditions (e.g., room temperature or operating temperature) and calculated from the failure load divided by the cross-sectional area resisting the load and reported in units of pound-force per square inch (psi) in US Customary units or megapascals (MPa) in SI units.

In various embodiments, for example, the ultimate compressive strength of the frangible ring member 261 material is equal to a value within a range of 10% to 95% of the predicted overload; or, in various embodiments, the ultimate compressive strength is equal to a value within a range of 25% to 90% of the predicted overload; or, in various embodiments, the ultimate compressive strength is equal to a value within a range of 50% to 90% of the predicted overload; or, in various embodiments, the ultimate compressive strength is equal to a value within a range of 70% to 80% of the predicted overload.

Figure 3B:
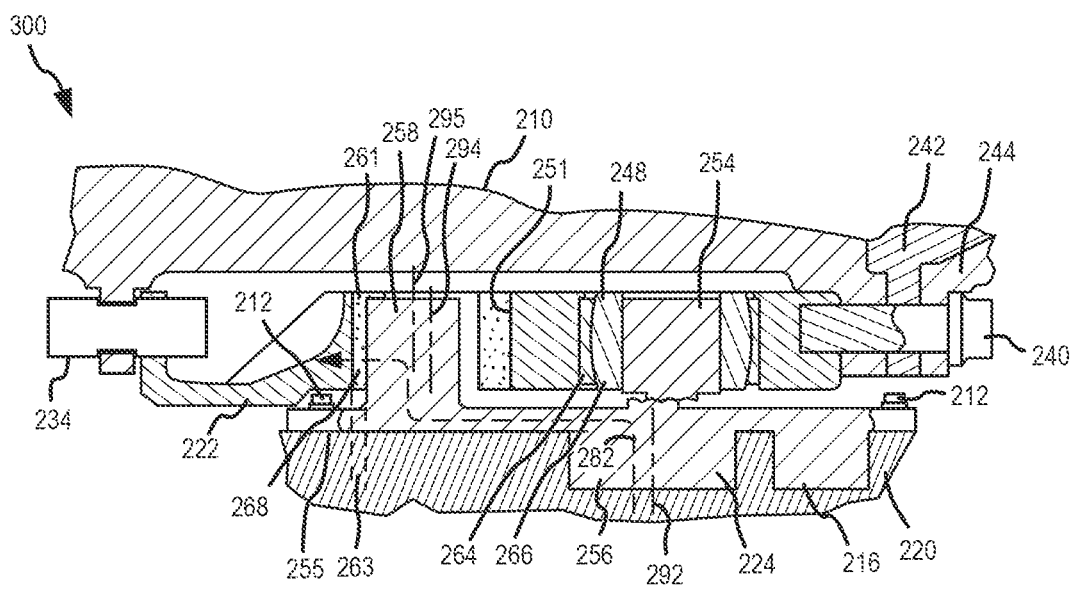
FIG. 3B provides a schematic circumferential view of the gearbox mounting assembly shown in FIG. 3A, with a collapsed frangible ring member and a broken fusible guide pin, in accordance with various embodiments.

With reference to FIG. 3B, gearbox mounting assembly 300 is illustrated after a FBO event and with the third member 258 moved (i.e., axially with respect to the central rotational axis A described above, or radially with respect to central axis 294 of second cylindrical aperture 251) within second cylindrical aperture 251 with at least one wall portion 268 of the frangible ring member 261 collapsed such that the thickness 263 of the collapsed wall portion 268 is less than the initial thickness. In this regard, the central axis 295 of third member 258 can be moved radially with respect to central axis 294. After the FBO event, a degree of movement (i.e., left and right in FIG. 2C) of locator 224 (and third member 258) may be permitted, while still maintaining third member 258 captured within frangible ring member 261 and/or second cylindrical aperture 251 to limit movement of the gearbox housing 220 with respect to engine case 210 (see FIG. 2B). In this regard, at least a portion of the frangible ring member 261 is configured to collapse in response to an overload event.

Figure 4:
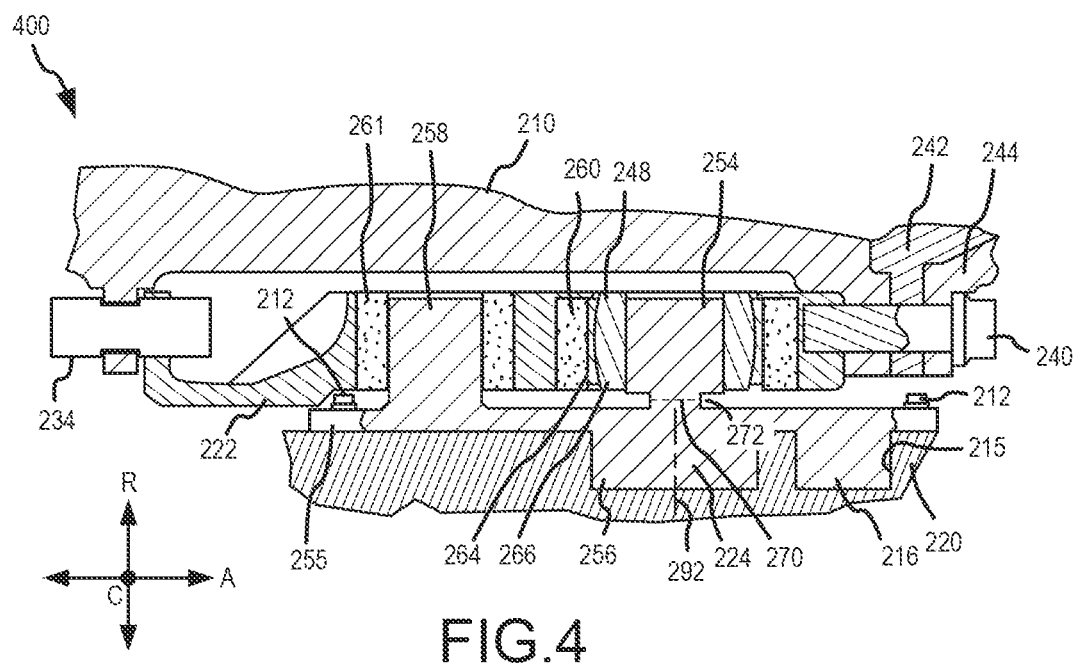
FIG. 4 provides a schematic circumferential view of a gearbox mounting assembly, including a support bracket and a locator comprising a guide pin supported by a first frangible ring member and a catcher pin supported by a second frangible ring member, mounted to a portion of an engine case, in accordance with various embodiments.

With reference to FIG. 4, a gearbox mounting assembly 400 is illustrated, in accordance with various embodiments. Gearbox mounting assembly 400 is similar to gearbox mounting assembly 300, except that gearbox mounting assembly 400 further includes a frangible ring member 260 disposed around first member 254 for dissipating energy during an overload event. With respect to FIG. 4, elements with like element numbering, as depicted in FIG. 3A, are intended to be the same and will not necessarily be repeated for the sake of clarity. Frangible ring member 260 can be similar to frangible ring member 261, except that frangible ring member 260 is provided between first member 254 and support bracket 222. Frangible ring member 260 can be coupled to support bracket 222 in a similar manner as frangible ring member 261, in accordance with various embodiments. In various embodiments, bearing member 248 is disposed between frangible ring member 260 and first member 254. In various embodiments, a central axis of frangible ring member 260 is oriented radially with respect to the central rotational axis A described above.

Figures 5A, 5B:
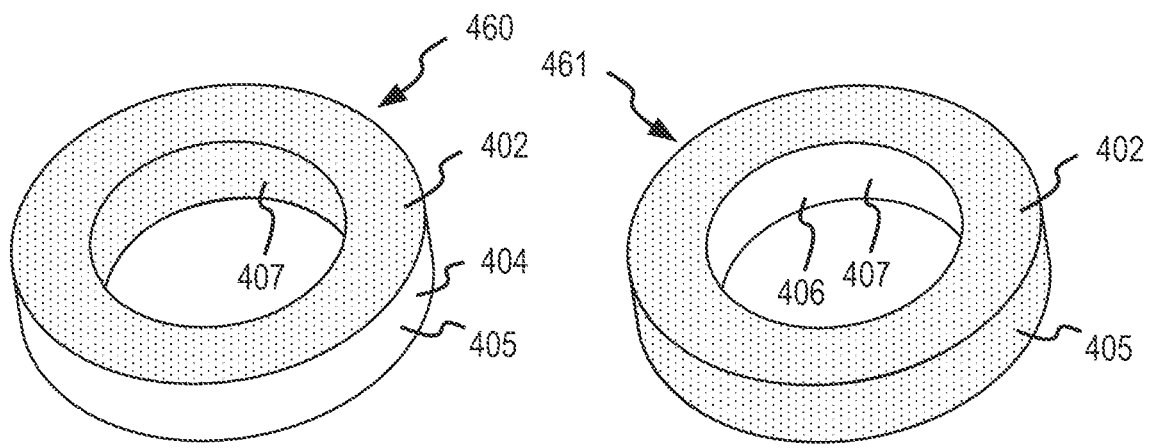
FIG. 5A provides a schematic perspective view of a frangible ring member having an outer support ring, in accordance with various embodiments.
FIG. 5B provides a schematic perspective view of a frangible ring member having an inner support ring, in accordance with various embodiments.

With reference to FIG. 5A, a perspective view of a frangible ring member 460 is illustrated, in accordance with various embodiments. In various embodiments, frangible ring member 460 comprises a porous metal material 402 (e.g., a metal foam or honeycomb structure) formed into an annular shape. Frangible ring member 460 may further comprise a thin metal outer ring 404 which extends from a first side of the metal material 402 to a second (opposite) side of the metal material 402. Outer ring 404 may define an outer diameter surface 405 of the frangible ring member 460. In this regard, the outer diameter surface 405 may be a smooth, closed surface. In various embodiments, the inner diameter surface 407 may comprise an open cell surface defined by metal material 402, though in various embodiments, as illustrated in FIG. 5B, the inner diameter surface 407 may be defined by a thin metal inner ring 406. In this regard, with momentary reference to FIG. 5B, the inner diameter surface 407 may be a smooth, closed surface defined by inner ring 406. Inner ring 406 may extend from a first side of the metal material 402 to a second (opposite) side of the metal material 402. It should be understood that while illustrated as having an outer ring 404 (see FIG. 5A) or an inner ring 406 (see FIG. 5B), frangible ring member 460 and/or frangible ring member 461 may comprise outer ring 404, inner ring 406, both, or neither, in accordance with various embodiments. Inner ring 406 and/or outer ring 404 may provide a smooth, reinforced surface for adjacent components to contact (e.g., for a press fit connection). In various embodiments, outer ring 404 and/or inner ring 406 are formed as a single piece component with metal material 402 (e.g., additively manufactured as a single, monolithic, piece). In various embodiments, metal material 402, outer ring 404, and/or inner ring 406 are made from a metal material such as aluminum, steel, or alloys thereof. In various embodiments, outer ring 404, and/or inner ring 406 may be a thin-walled ring, for example comprising a wall thickness less than 2% of the overall diameter of frangible ring member 460. It should be understood that any of the frangible ring members of the present disclosure (e.g., frangible ring member 260 and/or frangible ring member 261) may be similar to frangible ring member 460 and/or frangible ring member 461.

Various benefits of the foregoing disclosure may be realized. For example, the various embodiments provide a manner to maintain the axial degree of freedom of the locator in place by limiting movement of the support bracket to small distances in the radial and the axial directions following an overload event. The various embodiments also provide a manner of maintaining the bearing element (typically a spherical bearing) in its proper position and orientation following an overload event.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Finally, any of the above-described concepts can be used alone or in combination with any of or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An assembly for mounting an auxiliary component to an engine case of a gas turbine engine, comprising:
   a support bracket, the support bracket having a first end configured for attachment to a first flange of the engine case, a second end configured for attachment to a second flange of the engine case, and an intermediate portion located intermediate the first end and the second end;
   a first aperture disposed in the intermediate portion;
   a second aperture disposed in the intermediate portion; and
   a locator comprising a plate member, a fusible guide pin extending from the plate member at least partially into the first aperture, a catcher pin extending from the plate member at least partially into the second aperture, and a third pin extending from the plate member and configured to be received by the auxiliary component;
   wherein the fusible guide pin comprises a mechanical fuse configured to break in response to an overload event.

2. The assembly of claim 1, wherein the third pin extends from the plate member in a direction opposite the fusible guide pin and the catcher pin.

3. The assembly of claim 2, wherein the catcher pin is configured to limit movement of the locator with respect to the support bracket when the mechanical fuse is broken.

4. The assembly of claim 3, wherein the locator further comprises an anti-rotation pin extending from the plate member and configured to be received by the auxiliary component, and the anti-rotation pin extends from the plate member in the direction opposite the fusible guide pin and the catcher pin.

5. The assembly of claim 4, wherein the anti-rotation pin is configured to react a torque load about a central axis of the third pin, the torque load generated in response to contact between the catcher pin and the support bracket when the fusible guide pin is broken, to prevent rotation of the locator with respect to the auxiliary component.

6. The assembly of claim 5, wherein the anti-rotation pin is located opposite the third pin from the catcher pin.

7. The assembly of claim 6, further comprising a bearing member disposed at least partially within the first aperture;
   wherein the fusible guide pin is disposed at least partially within the bearing member.

8. The assembly of claim 7, wherein the bearing member is press fit at least partially into the support bracket, and the fusible guide pin is disposed at least partially in the bearing member.

9. The assembly of claim 3, wherein a first central axis of the fusible guide pin and a second central axis of the catcher pin are oriented radially with respect to the engine case.

10. The assembly of claim 3, wherein a first diameter of the second aperture is greater than a second diameter of the catcher pin.

11. A gas turbine engine, comprising:
    an engine case, the engine case including a first flange and a second flange;
    an auxiliary component;
    a support bracket, the support bracket having a first end configured for attachment to the first flange of the engine case, a second end configured for attachment to the second flange of the engine case, and an intermediate portion located intermediate the first end and the second end;

a first aperture disposed in the intermediate portion;
a second aperture disposed in the intermediate portion; and
a locator comprising a plate member, a fusible guide pin extending from the plate member at least partially into the first aperture, and a catcher pin extending from the plate member at least partially into the second aperture, and a third pin extending from the plate member and configured to be received by the auxiliary component.

12. The gas turbine engine of claim 11, wherein the locator further comprises an anti-rotation pin extending from the plate member and configured to be received by the auxiliary component.

13. The gas turbine engine of claim 12, wherein the third pin and the anti-rotation pin extend from the plate member in a direction opposite the fusible guide pin and the catcher pin.

14. The gas turbine engine of claim 13, wherein the anti-rotation pin is located opposite the third pin from the catcher pin.

15. The gas turbine engine of claim 11, wherein the catcher pin is configured to limit movement of the locator with respect to the support bracket when the mechanical fuse is broken.

16. The gas turbine engine of claim 15, further comprising a bearing member disposed at least partially within the first aperture;
wherein the fusible guide pin is disposed at least partially within the bearing member.

17. The gas turbine engine of claim 16, wherein the bearing member is press fit at least partially into the support bracket, and the fusible guide pin is disposed at least partially in the bearing member.

18. The gas turbine engine of claim 15, wherein a first diameter of the second aperture is greater than a second diameter of the catcher pin.

19. The gas turbine engine of claim 18, wherein the second aperture is oversized to allow radial movement, with respect to a central axis of the second aperture, of the catcher pin within the second aperture.

20. A locator for mounting an auxiliary component to an engine case of a gas turbine engine, comprising:
a plate member;
a fusible guide pin extending from the plate member in a first direction;
a catcher pin extending from the plate member in the first direction; and
a third pin extending from the plate member in a second direction, opposite the first direction;
wherein the third pin is disposed substantially coaxially with the fusible guide pin.

* * * * *